United States Patent [19]

Nishida et al.

[11] Patent Number: 5,247,029

[45] Date of Patent: Sep. 21, 1993

[54] CATIONICALLY ELECTRODEPOSITABLE PAINT COMPRISING HYDROXYL AND CATIONIC GROUP-CONTAINING RESIN AND ALICYCLIC EPOXY RESINS

[75] Inventors: Reiziro Nishida; Akira Tominaga, both of Chigasaki, Japan

[73] Assignee: Kansai Paint Co., Ltd., Kanagawa, Japan

[21] Appl. No.: 772,616

[22] Filed: Oct. 7, 1991

Related U.S. Application Data

[63] Continuation of Ser. No. 401,138, Aug. 30, 1989.

[30] Foreign Application Priority Data

Aug. 30, 1988 [JP] Japan .................................. 63-213660
Dec. 23, 1988 [JP] Japan .................................. 63-323591

[51] Int. Cl.⁵ ........................ C08L 63/02; C08L 63/04
[52] U.S. Cl. ...................................... 525/526; 525/117; 525/131; 525/182; 525/208; 525/486; 523/404
[58] Field of Search ..................... 525/524, 486, 526

[56] References Cited

U.S. PATENT DOCUMENTS

| | | | |
|---|---|---|---|
| 3,567,797 | 3/1971 | Mango et al. | 525/524 |
| 3,625,918 | 12/1971 | Heer et al. | 525/524 |
| 3,792,011 | 2/1974 | Smith et al. | 525/524 |
| 3,869,366 | 4/1975 | Suzuki et al. | 525/524 |
| 3,919,348 | 11/1975 | Foster et al. | 525/524 |
| 4,365,043 | 12/1982 | Konishi et al. | 525/524 |
| 4,867,854 | 9/1989 | McIntyre | 525/524 |

*Primary Examiner*—Robert E. Sellers
*Attorney, Agent, or Firm*—Wenderoth, Lind & Ponack

[57] ABSTRACT

A resin composition for a cationically electrodepositable paint comprising
(A) a resin having hydroxyl groups and cationic groups such as tertiary amino groups prepared from the reaction product of a polyepoxide compound and an secondary amine having hydroxyl group(s), and
(B) an epoxy resin having at least 2 epoxy functional groups each of which comprises an epoxy group directly bound to an alicyclic ring and/or bridged alicyclic ring on average per molecule.

14 Claims, No Drawings

CATIONICALLY ELECTRODEPOSITABLE PAINT COMPRISING HYDROXYL AND CATIONIC GROUP-CONTAINING RESIN AND ALICYCLIC EPOXY RESINS

This application is a continuation of now abandoned application, Ser. No. 07/401,138 filed Aug. 30, 1989.

The present invention relates to a resin composition for a cationically electrodepositable paint which is excellent in stability and curability without using a block polyisocyanate as a curing agent and an organotin compound as a curing catalyst, and in addition having excellent film performances such as good adhesion and good weather resistance.

As a conventional resin composition for a cationically electrodepositable paint, a resin composition comprising an aromatic polyisocyanate compound blocked by alcohols (curing agent) and a polyamine resin such as an amine-added epoxy resin as a primary component is most widely used. This resin has earned an excellent assessment with reference to corrosion resistance of the paint film; however, this resin composition has essential defects in, the following points. First of all, curing initiating temperature is high (at least 170° C.), and to lower this curing initiating temperature, when an organotin compound is used as a curing catalyst, said tin compound sometimes poisons an exhaust combustion catalyst of the baking furnace. Further, to cure the paint film, when the film is heated at a high temperature, the blocked polyisocyanate thermally decomposes to produce gum and soot which, in addition, brings about yellowing, bleeding and curing impediment of the top coat film. At the same time, said top coat film remarkably lowers in weather resistance and tends to be whitened. These are serious drawbacks and therefore the improvement thereof is strongly desired.

Because of this, the present inventors made assiduous investigations with a view to providing a resin composition for a cationically electrodepositable paint having an excellent merit of such an isocyanate curing type without using a blocked isocyanate compound and an organotin compound. The invention has solved the aforesaid drawbacks brought about by the use of these compounds.

A resin composition for an electrodepositable paint utilizing a self-curability due to a ring-opening reaction of an epoxy group without using a curing agent is also known, which is proposed, for example, in GB-1306101A, GB-1306102A and GB-1327071A as well as U.S. Pat. Nos. 3,937,679 and 3,975,346, in none of which, the stability of the bath for the electrodepositable paint is compatible with the curability of the paint film. For example, the glycidyl ether type polyepoxy compound which is most general of these resin compositions is excellent in the curability, but inferior in the bath stability.

Accordingly, by the use of the specified polyfunctional polymer of a certain kind as a curing agent, the present inventors found a resin composition for a cationically electrodepositable paint which is excellent in stability and curability without lowering its corrosion resistance, capable of solving the aforesaid drawbacks caused by the use of an organotin compound and a blocked polyisocyanate compound, excellent in adhesion due to non-occurrence of strain by volumetric shrinkage, remarkably improved in weather resistance of the paint film and also excellent in low temperature curability, and have completed the present invention.

Thus, according to the present invention, there is provided a resin composition for a cationically electrodepositable paint comprising (A) a resin having hydroxyl groups and cationic groups; and (B) an epoxy resin having at least 2 epoxy functional groups each of which comprises an epoxy group directly bound to an alicyclic ring and/or bridged alicyclic ring on average per molecule as principal components.

An electrodeposited paint film formed with a paint using the resin composition for a cationically electrodepositable paint of the present invention is cured at a temperature of less than about 250° C. Especially, when compounds containing metals such as lead, zirconium, cobalt, aluminum, manganese, copper, zinc, iron, chromium and nickel are blended singly or in combination as a catalyst, the electrodeposited paint film can be cured with heating at such a low temperature as from about 70° C. to about 160° C. It is inferred that these curings are attributable to ring-opening of an epoxy group contained in the epoxy resin (B) and reaction with a (preferably primary) hydroxyl group in the resin (A), and to reaction of one epoxy group with another in the epoxy resin (B) to form ether bonds, respectively that crosslink and cure the resin composition.

Accordingly, the resin composition for a cationically elecrodepositable paint of the present invention has various excellent advantages such as it can be cured at a low temperature of not more than 160° C. in the absence of a tin catalyst. Further it is free from a blocked isocyanate compound or a derivative thereof and can dissolve the aforesaid various drawbacks produced by their use. It is free from the volumetric shrinkage due to thermal decomposition and exhibits good adhesions. It is free from an aromatic urethane linkage or aromatic urea linkage and does not hurt the weather resistance. It is excellent in corrosion resistance, curability and bath stability.

The resin (A) having hydroxyl groups and cationic groups used in the composition of the present invention which may be hereinafter referred to as "the base resin (A))" is optionally resin containing hydroxyl groups reactive with the epoxy group of the component (B) and a sufficient number of cationic groups for forming a stable aqueous dispersion. As said base resin (A), for example, what follows may be cited.

(i) A reaction product obtained by reacting a polyepoxy resin with a cationizing agent;

(ii) A polycondensation product of a polycarboxylic acid and polyamine (see U.S. Pat. No. 2,450,940) protonated with an acid;

(iii) A polyaddition product of polyisocyanate and polyol and mono- or poly-amine protonated with an acid;

(iv) A copolymer of an acryl or vinyl monomer containing a hydroxyl group and one containing amino group protonated with an acid (see Japanese Patent Publications Nos. 12395/1970 and 12396/1970);

(v) An adduct of a polycarboxylic acid resin and an alkylene imine protonated with an acid (see U.S. Pat. No. 3,403,088); etc.

Since the specific examples of these cationic resins and the processes for their production are described in, for example, Japanese Patent Publications Nos. 12395/1970 and 12396/1970, and GB 1327071 as well as U.S. Pat. Nos. 2,450,940, 3,403,088, 3,891,529 and 3,963,663, detailed description of the specific examples of these cationic resins and the processes for their production is replaced by quotation of these references in this specification.

What is especially desirable as the base resin (A) in the present invention is a reaction product obtained by reacting a polyepoxide compound obtained from a polyphenol compound and epichlorohydrin with a cationizing agent included in (i), above.

Said polyepoxide compound is a compound having at least 2 epoxy groups

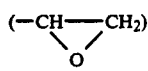

in one molecule, and having a number average molecular weight within the range of generally at least 200, preferably 400 to 4,000, more preferably 800 to 2,000 is suitable. As such polyepoxide compound, what is known per se may be used, for example, polyglycidyl ether of a polyphenol compound which may be produced by reacting a polyphenol compound with epichlorohydrin in the presence of an alkali, is included.

As the polyphenol compound which may be used in the above reaction, there may be cited, for example, bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butyl-phenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4'-dihydroxydiphenylether, 4,4'-dihydroxydiphenylsulfone, phenol novolak and cresol novolak.

Of the aforesaid polyepoxide compounds, what is especially preferable for the production of the base resin (A), is diglycidylether of a bisphenol compound having a number average molecular weight of at least about 380, more preferably about 800 to about 2,000 and an epoxy equivalent of 190 to 2,000, preferably 400 to 1,000, especially that represented by the following formula:

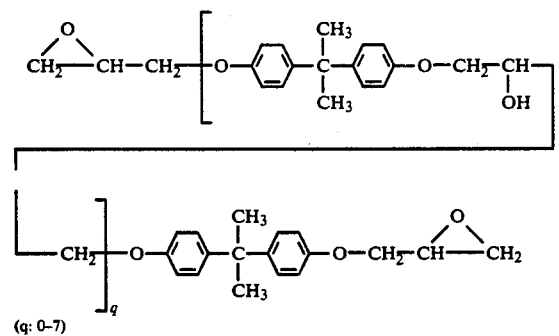

(q: 0-7)

Said polyepoxide compound may be partly reacted with polyol, polyether polyol, polyester polyol, polyamide amine, a polycarboxylic acid and polyisocyanate, and further, it may be graft polymerized with ε-caprolactone or an acrylic monomer, etc.

On the other hand, as a cationizing agent for introducing a cationic group to said polyepoxide compound, there may be cited an aliphatic, alicyclic or aromatic-aliphatic primary or secondary amine, tertiary amine salt, secondary sulfide salt and tertiary phosphine salt. These react with an epoxy group to produce a cationic group. It is further possible to introduce a cationic group by reacting a tertiary amino monoisocyanate obtained from a tertiary aminoalcohol and a diisocyanate, with a hydroxyl group of the epoxy resin.

As examples of the amine compound in said cationizing agent, for example, the following amines may be exemplified.

(1) Primary amines such as methyl amine, ethyl amine, n- or iso-propyl amine, monoethanol amine and n- or iso-propanol amine;

(2) Secondary amines such as diethyl amine, diethanol amine, di-n- or iso-propanol amine, N-methylethanol amine and N-ethylethanolamine; and (3) Polyamines such as ethylene diamine, diethylene triamine, hydroxyethylaminoethyl amine, ethylaminoethyl amine, methylaminopropyl amine, dimethylaminoethyl amine and dimethylaminopropyl amine.

Of these amines, alkanol amines having hydroxyl groups are preferable. Also, a primary amino group of polyamines may be reacted with ketone in advance to block said group, and then the remaining active hydrogen may be reacted with an epoxy group.

Further, besides said amine compounds, a basic compound such as ammonia, hydroxyl amine, hydroxyethyl hydrazine and a N-hydroxyethyl imidazoline compound may be used similarly. Basic groups formed by using these compounds may be protonated with an acid, especially preferably a water-soluble organic carboxylic acid such as formic acid, acetic acid, glycolic acid and lactic acid to be made into cationic groups.

Furthermore, tertiary amines such as triethyl amine, triethanol amine, N,N-dimethylethanol amine, N-methyldiethanol amine, N,N-diethylethanol amine and N-ethyldiethanol amine may be used, they may be protonated with an acid in advance, and then reacted with an epoxy group to be made into quaternary salts.

Besides the salts of tertiary amines, salts of sulfides such as diethyl sulfide, diphenyl sulfide, tetramethylene sulfide or thiodiethanol and boric acid, carbonic acid or an organic monocarboxylic acid may be reacted with an epoxy group to make them tertiary sulfonium salts.

In addition, salts of phosphines such as triethyl phosphine, phenyldimethyl phosphine, diphenylmethyl phosphine or triphenyl phosphine and such acids as mentioned above may be reacted with an epoxy group to form quaternary phosphonium salts.

As hydroxyl groups of the base resin (A) used in the present invention, there may be cited, for example, primary hydroxyl groups of alkanol amines as said cationizing agent, of ring opened caprolactone and of general polyols; and secondary hydroxyl groups of epoxide resin. Of these, primary hydroxyl groups by alkanol amines are preferable because of excellent in cross-linking reactivity with the epoxy resin (B). As such alkanol amines, what is exemplified in said cationizing agent is preferable.

The content of hydroxyl groups in the base resin (A) is, from the point of view of the crosslinking reactivity with the epoxy group contained in the epoxy resin (B), preferably, calculated as a hydroxyl group equivalent, within the range of 20 to 5,000, especially 100 to 1,000. Especially, the primary hydroxyl group equivalent is preferably within the range of 200 to 1,000. The content of cationic groups is preferably in excess of the lower limit necessary for stably dispersing said base resin (A), and generally it is preferably within the range of 3 to 200, especially from 10 to 80 calculated as amine value KOH mg/g the solids. However, even if the cationic group content is less than 3, it is possible to use it after making it an aqueous dispersion by the use of a surface active agent; in this case, however, it is desirable to adjust the cationic group so as to make the pH of the aqueous dispersed composition, usually 4 to 9, more preferably 6 to 7.

The base resin (A) used in the present invention has hydroxyl groups and cationic groups and is desirably free from free epoxy groups as a rule.

Next, an explanation will be made with reference to the epoxy resin (B) used in admixture with said base resin (A) as a curing agent.

Said epoxy resin (B) which may be referred to hereinafter as "the curing resin (B)") is a curing agent for forming a crosslinked paint film mainly by an etherification reaction with the base resin (A) as mentioned above, which contains at least 2, preferably at least 3, specified "epoxy functional groups" on average in one molecule.

Namely, said epoxy functional group in the curing resin (B) comprises an epoxy group directly bonded to an alicyclic ring and/or bridged alicyclic ring in which said alicyclic ring is a 4-10 member, preferably 5-6 member saturated carbon monocyclic or polycyclic ring, while said bridged alicyclic ring contains bridges (endomethylene, endoethylene, etc.) of a straight chain (linear) or branched $C_{1-6}$ (preferably $C_{1-4}$) alkylene group (for example, $-CH_2-$, $-CH_2CH_2-$, $-CH(CH_3)-$, $-CH_2(CH_3)CH_2-$, $-C(CH_3)_2-$, $-CH(C_2H_5)CH_2-$, etc.) between 2 carbon atoms constituting said monocyclic or polycyclic ring.

On the other hand, an epoxy group

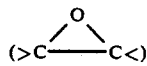

is important in that one of the carbon atoms in said epoxy group is directly bonded to the cyclic carbon atom (or atoms) of said alicyclic ring or said bridged alicyclic ring [see, for example, the following formulae (I) and (II)], or the two carbon atoms of said epoxy group are common with the two adjoining carbon atoms constituting the ring in said alicyclic ring or said bridged alicyclic ring [see, for example, the following formulae (III) and (IV)].

As the specific examples of such epoxy functional group, what is represented by the following formulae (I) to (IV) may be cited.

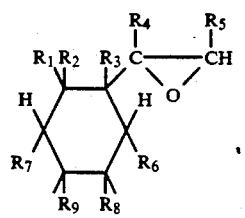
(I)

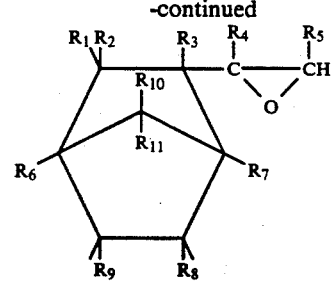
(II)

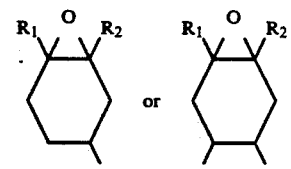
(III)

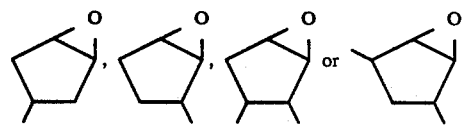
(IV)

wherein
$R_1$, $R_2$, $R_3$, $R_5$, $R_6$, $R_7$, $R_{10}$ and $R_{11}$ represent H, $CH_3$ or $C_2H_5$, respectively, while $R_4$, $R_8$ and $R_9$ represent H or $CH_3$, respectively.

The epoxy resin (B) used in the present invention may have at least 2, preferably at least 3, more preferably at least 4, epoxy functional groups selected from said formulae (I) to (IV) on average in one molecule. For example, the epoxy resin (B) may have at least one kind of the epoxy functional group represented by said formula (I) or (II), or may have at least one kind of the epoxy functional group represented by said formula (III) or (IV) in one molecule. Furthermore, the epoxy resin (B) may have at least one kind of the epoxy functional group represented by said formula (I) or (II) and at least one kind of the epoxy functional group represented by said formula (III) or (IV) within one and same molecule or in different molecules.

Of the epoxy functional group represented by said formula (I) or (III) is preferable, and especially, an epoxy functional group represented by the following formula (V)

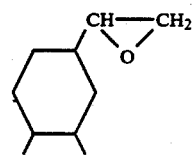
(V)

or an epoxy functional group represented by the following formula (VI) are preferable.

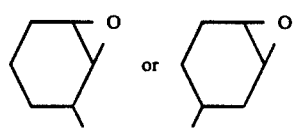
(IV)

Additionally, the epoxy equivalent and the molecular weight of the epoxy resin (B) used in the present invention are not strictly restricted, but are changeable according to a process for the production thereof and the use of the end resin composition. But, generally speaking, the epoxy equivalent may be within the range of usually 100 to 2,000, preferably 150 to 500, more preferably 150 to 250.

And it is proper that the number average molecular weight is within the range of usually 400 to 100,000, preferably 700 to 50,000, more preferably 700 to 30,000.

The epoxy resin [the curing resin (B)] having at least 2 such epoxy functional groups in one molecule is described in literatures such as, for example, Japanese Patent Publication No. 8016/1981 as well as Japanese Laid-Open Patent Publications Nos. 47365/1982, 166675/1985, 221121/1968 and 234028/1988, and what is known per se may be used.

Or said epoxy resin (B) having said epoxy functional groups is obtained by processes known per se. The main processes for producing said epoxy resin (B) will be enumerated hereinbelow, but the enumerated processes are not limitative.

A first process for the production:

A process for producing an epoxy resin having at least 2 epoxy functional groups in one molecule which comprises epoxidating part of carbon-carbon double bonds of an alicyclic compound having said at least 2 carbon-carbon double bonds in one molecule, subjecting the resulting epoxy groups to a ring-opening polymerization, and thereafter epoxidating said double bonds remaining in the resulting polymer.

A second process for the production:

A process for subjecting an alicyclic compound having at least 2 epoxy groups in the same molecule to a ring-opening polymerization to such an extent as may not eliminate all of said epoxy groups on the basis of said epoxy groups.

A third process for the production:

A process for polymerizing a compound having an epoxy functional group and a polymerizable unsaturated bond in the same molecule.

A more specific explanation will be made with reference to these processes for the production hereinbelow.

The First Process for the Production

This process comprises epoxidating part of carbon-carbon double bonds (a partial epoxidation product) contained in an alicyclic compound having at least 2 carbon-carbon double bonds in one molecule [hereinafter referred to as "the alicyclic compound (C)"], obtaining a ring-opened polymer of said partial epoxidation product by ring-opening polymerization of the resulting epoxy groups, and thereafter epoxidating part or whole of said double bonds remaining in said polymer to thereby obtain a curing resin (B).

The alicyclic compound (C) is a compound having a structure of an alicyclic ring or a bridged alicyclic ring mentioned above and at least 2 carbon-carbon double bonds, existing between 2 adjoining carbon atoms constituting the ring structure or between the other carbon atoms being directly bonded to said ring structure.

The alicyclic compound (C) may also be obtained by heating, for example, a conjugated diene compound by a known method. As such conjugated diene compound, an aliphatic or alicyclic compound having 4 to 30 carbon atoms and having at least 1 pair, preferably 1 to 5 pairs of conjugated double bonds in one molecule is suitable.

Specific examples of such conjugated diene compound include butadiene, isoprene, pirylene, 1,3-hexadiene, 2,4-hexadiene, 2,4-heptadiene, 2-methyl-6-methylene-2,7-octadiene, 2,6-dimethyl-1,5,7-octatriene, cyclopentadiene, cyclohexadiene, 4-ethyl-2-methylcyclopentadiene, 3-isopropyl-1-methylcyclopentadiene, 5-isopropylcyclopentadiene, 1,2,3,4-tetraphenylcyclopentadiene, 1,2,4-triphenylcyclopentadiene, 1,4-diphenylcyclopentadiene, 1,3-octachloropentadiene, hexachlorocyclopentadiene, 5,5-diethoxy-1,2,3,4-tetrachlorocyclopentadiene, 1,2,3,4,5-pentachlorocyclopentadiene, 1,2,3,4-tetrachlorocyclopentadiene, 1,3-cycloheptadiene, 1,3-cyclooctadiene, 1,3,5-cyclooctatriene, 1,3,6-cyclooctatriene, cyclooctatetraene, chlorocyclooctatetraene, bromocyclooctatetraene and 5-cyclohexylidenecyclopentadiene. These conjugated diene compounds may be used singly or in combination, respectively.

As required, when a conjugated diene compound under heating is reacted in the presence of a Ziegler catalyst, the alicyclic compound (C) is obtained. This reaction under heating may be carried out by a method known per se, for example, by a method disclosed in Japanese Laid-Open Patent Publication No. 102643/1974.

When typical examples of the so obtained alicyclic compound (C) are shown, they are as follows.

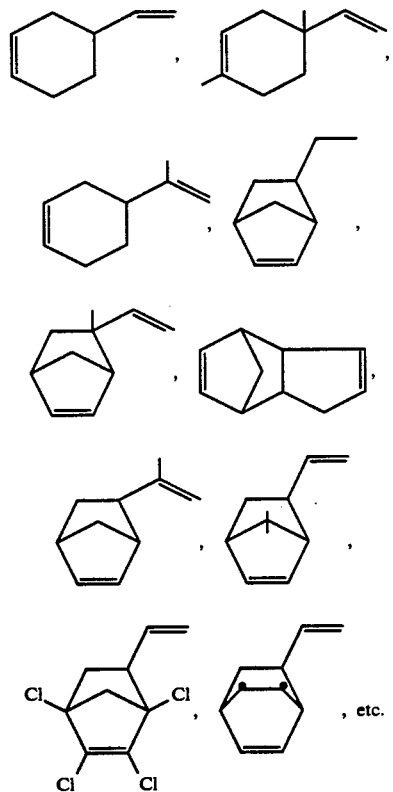

Of the aforesaid conjugated diene compounds, alicyclic compounds such as cyclopentadiene, cyclohexadiene and 4-ethyl-2-methylcyclopentadiene; and such compounds as sylvestrene, 2,8(9)-p-menthadiene, pyronene, 1,3-dimethyl-1-ethyl-3,5-cyclohexadiene, terpinene, phellandrene, dipentene, iso-limonene and limonene have already structures of the alicyclic compound (C), therefore, these compounds may be used per se without being subjected to said reaction under heating.

At first, part of (at least 2) carbon-carbon double bonds contained in the alicyclic compound (C) is modified to epoxy groups with a peroxide and so forth (partial epoxidation). The partial epoxidation product is obtained by modifying part of a plurality of double bonds contained in said alicyclic compound (C) to epoxy groups. When specific examples of such partial epoxidation product are shown, they are as follows.

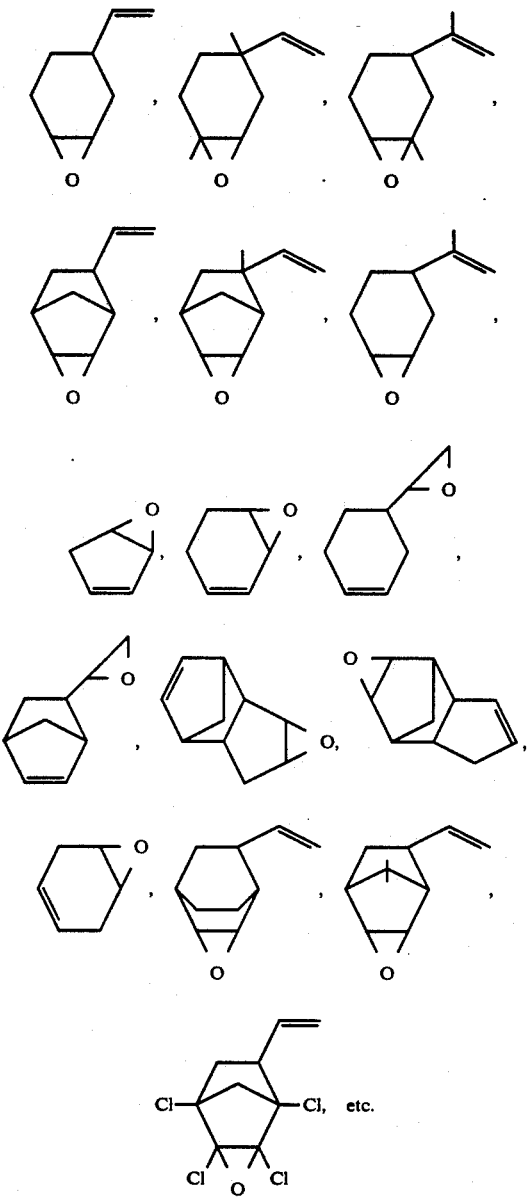

Naturally available epoxy carene may also be used as a partial epoxidation product.

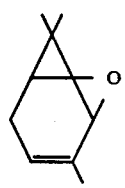

A partial epoxidation product has at least 1 epoxy group and at least 1 carbon-carbon double bond in one molecule, and said double bond is required to exist between 2 adjoining carbon atoms constituting the ring or between the other carbon atoms directly bonded to said ring.

Next, based on epoxy groups in this partial epoxidation product, a ring-opening polymerization is carried out to obtain a polymer of the alicyclic compound (C). It is preferable to use a polymerization initiator for this ring-opening polymerization, and the terminal of the end product of the curing resin (B), a residue X by the initiator component(s) may be bonded, where X is a residue of an organic compound having active hydrogen. As an organic compound having active hydrogen which is a precursor of X, there may be cited, for example, alcohols, phenols, carboxylic acids, amines and thuiols. Of these, as the alcohols, either one or monohydric alcohols or di- or higher polyhydric alcohols will do. Specific examples of the alcohols include aliphatic monohydric alcohols such as methanol, ethanol, propanol, butanol, pentanol, hexanol and octanol; an aromatic monohydric alcohol such as benzyl alcohol; and polyhydric alcohols such as ethylene glycol, diethylene glycol, triethylene glycol, polyethylene glycol, propylene glycol, dipropylene glycol, 1,3-butanediol, 1,4-butanediol, pentanediol, 1,6-hexanediol, neopentyl glycol, hydroxypivalic acid neopentyl glycol ester, cyclohexane dimethanol, glycerin, polyglycerin, trimethylol propane, trimethylol ethane, pentaerythritol and dipentaerythritol.

Specific examples of the phenols include phenol, cresol, catechol, pyrogallol, hydroquinone, hydroquinone monomethylether, bisphenol A, bisphenol F, 4,4'-dihydroxybenzophenone, bisphenol S, phenol resin and cresol novolak resin.

As the carboxylic acids, there may be illustrated formic acid, acetic acid, propionic acid, butyric acid, fatty acid of animal and vegetable oils; fumaric acid, maleic acid, adipic acid, dodecanoic diacid, trimellitic acid, pyromellitic acid, polyacrylic acid, phthalic acid, isophthalic acid and terephthalic acid, and further, a compound having both hydroxyl group and a carboxylic acid such as lactic acid, citric acid and hydroxycaproic acid may be used as well.

Besides, as the other compound having active hydrogen, a mixture of water and alkoxysilane such as tetramethyl silicate, tetraethyl silicate, methyltrimethoxysilane, methyltriethoxysilane, dimethyl dimethoxysilane and phenyl trimethoxysilane or silanol compounds of these; polyvinyl alcohol, a polyvinyl acetate partial hydrolyzed product, starch, cellulose, cellulose acetate, cellulose acetate butyrate, hydroxyethyl cellulose, acrylpolyol resin, styrene-allyl alcohol copolymer resin, styrene-maleic acid copolymer resin, alkyd resin, polyesterpolyol resin and polycaprolactonepolyol resin may be also used. Such compound may have an unsaturated double bond together with active hydrogen, further, said unsaturated double bond may be epoxidated. And a catalyst and a polymerization initiator may be the same like an alkoxy metal compound. Usually, the aforesaid organic compound having active hydrogen is used as a polymerization initiator, while the aforesaid partial epoxidation product such as, for example, 4-vinylcyclohexene-1-oxide, 4-vinylcyclo2,2,1)-3-methyl-4(or 5)-t-propenyl-1-cyclohexene oxide, 2,4- or 1,4-dimethyl-4-ethenyl-1-cyclohexene oxide, 4-vinylcyclo2,2,1]-heptene-1-oxide (vinylnorbornene oxide) and 2-methyl-4-isopropanyl-cyclohexene oxide are used singly or in combination upon carrying out a ring-opening polymerization. At this time, it is also possible to carry out a ring-opening polymerization in the co-presence of the other epoxy compound but belonging to said partial epoxidation product. As the other copolymerizable epoxy compound, any compound will do so long as it has an epoxy group, but suitable examples of such other copolymerizable epoxy compound include an oxide of an unsaturated compound such as ethylene oxide, propylene oxide, butylene oxide and styrene oxide; a glycidyl ether compound such as allylglycidyl ether, 2-ethylhexylglycidyl ether, methylglycidyl ether, butylglycidyl ether and phenylglycidyl ether; unsaturated organic carboxylic acid glycidyl ester compound such as acrylic acid and methacrylic acid; and an alicyclic oxiran group-containing vinyl monomer such as 3,4-epoxycyclohexyl methyl (meth)acrylate.

The aforesaid ring-opened polymer is obtained by ring-opening polymerizing epoxy groups contained in a partial epoxidation product alone or as required in the other epoxy compound made to be co-present with said partial epoxidation product to form an ether bond. The proportion of the other epoxy compound in a ring-opened polymer may be optionally selected in accordance with the object, but specifically, it is desirable to select said epoxy compound within such a range of proportion that said compound may have at least 2, preferably at least 3, more preferably at least 4, of one or more kinds of said structural formulae (I) to (IV) on average per molecule of the resulting ring-opened polymer. It is preferable that the number average molecular weight of the so obtained (co)polymer is within the range of usaully from 400 to 100,000, especially from 700 to 50,000, more especially 700 to 30,000.

It is generally preferable to carry out a ring-opening polymerization reaction in the presence of a catalyst.

Specific examples of the catalyst that can be used include amines such as methyl amine, ethyl amine, propyl amine and piperazine; organic bases such as pyridines and imidazoles; organic acids such as formic acid, acetic acid and propionic acid; inorganic acids such as sulfuric acid and hydrochloric acid; alkali metal alcoholates such as sodium methylate; alkalis such as KOH and NaOH: Lewis acid or its complexes such as $BF_3$, $ZnCl_2$, $AlCl_3$ and $SnCl_4$; and organometallic compounds such as triethyl aluminum, aluminum acetyl acetonate, titanium acetyl acetonate and diethyl zinc.

These catalysts may be used in amounts within the range of generally 0.001 to 10% by weight, preferably 0.1 to 5% by weight based on the reactant. The ring-opening polymerization temperature is within the range of generally about $-70°$ to about $200°$ C., preferably about $-30$ to about $100°$ C. The reaction may be carried out in the presence of a solvent, and it is preferable to use an ordinary organic solvent not having active hydrogen as a solvent.

In the ring-opened polymer, there are double bonds derived from the alicyclic compound (C), and the epoxy resin (B) is obtained by epoxidating part or whole of said double bonds. Epoxidation of the double bonds may be carried out by using an epoxidation agent such as, for example, peroxy acids and hydroperoxides. Whether a solvent should be used or not and the reaction temperature in the epoxidation reaction may be properly adjusted according to the apparatus used and the physical properties of the starting material. Depending on the conditions of the epoxidation reaction, simultaneous with epoxidation of the double bonds in the ring-opened polymer as a starting material, a side reaction occurs and the modified substituent may be contained in the skeleton of the epoxy resin sometimes. As such modified substituent, when, for example, peracetic acid is used as the epoxidation agent, a substituent of the following structure may be cited, which is considered to be attributable to reaction of the produced epoxy group with the by-produced acetic acid.

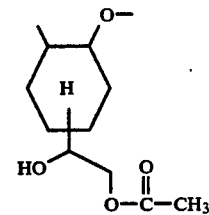

The ratio at which these substituents are contained in said skeleton is determined according to the kind of the epoxidation agent, the molar ratio of the epoxidation agent to the unsaturated bond and the reaction conditions.

The epoxy equivalent of the so obtained epoxy resin (B) is preferably within the range of generally 100 to 2,000, especially 150 to 500, more especially 150 to 250.

As such epoxy resin (B), what is commercially available may also be used, and as such products, for example, EHPE-3150, EHPE-3100 and EHPE-1150 (trade names of products of Daicel Chemical Industries, Ltd.) may be cited. These are epoxy resins of the following structural formula having cyclohexene skeletons using 4-vinylcyclohexene-1-oxide as a partial epoxidation product for their production.

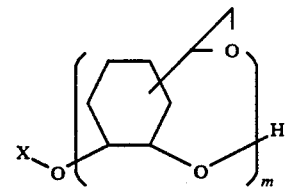

wherein m is at least 2, preferably at least 3, more preferably at least 4.

The Second Process for the Production

According to this process, the objective epoxy resin is obtained by, for example, epoxidating at least 2 double bonds of the double bonds contained in said alicyclic compound (C), and thereafter subjecting said compound (C) to a ring-opening polymerization in such a manner as to retain the resulting epoxy groups.

As said epoxidation product having at least 2 epoxy groups on average per molecule, the following monocyclic or condensed ring-type compounds may be shown as typical examples.

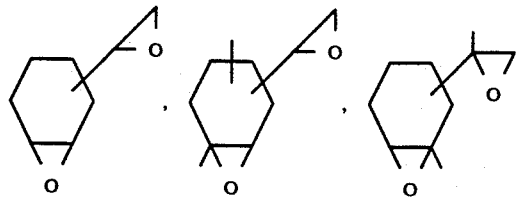

(For example, a product under a trade name of "Celoxide" of Daicel Chemical Industries, Ltd. may be cited),

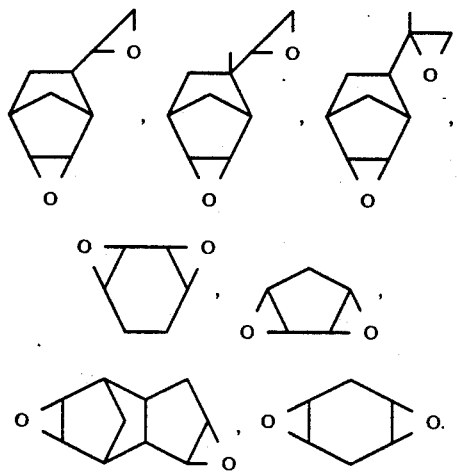

Specifically, at least one kind of said epoxy compound is subjected to a ring-opening polymerization, as required in the presence of a polymerization initiator and a catalyst in the same way as in the first process for the production mentioned above and the reaction is suspended at the predetermined reaction stage in which epoxy groups are remaining to thereby obtain the epoxy resin (B). For suspending the reaction, optional means such as dilution with a solvent and cooling may be used. In this process for the production, said other epoxy compound may be copolymerized as in said first process for the production as well.

The so obtained curing resin (B) may be an epoxy resin having at least one kind of the epoxy functional group shown by said formula (I) or (II) and at least one kind of the epoxy functional group shown by said formula (III) or (IV) in the same molecule or different molecules.

The so obtained ring-opened polymer [the curing resin (B)] preferably has a number average molecular weight within the range of generally 400 to 100,000, especially 700 to 50,000 and conveniently has an epoxy equivalent within the range of generally 100 to 2,000, especially 150 to 500, more especially 150 to 250.

The Third Process for the Production

As a compound having at least one epoxy functional group and a polymerizable unsaturated bond in the same molecule (which may be hereinafter referred to as "a polymerizable epoxy monomer"), there may be cited, for example, what is represented by the following general formulae ① to ⑫.

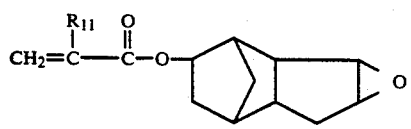  ① 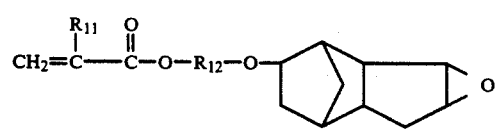 ②

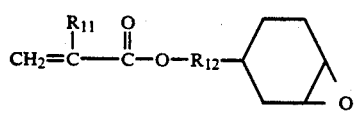  ③ 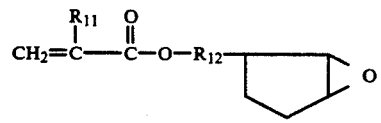 ④

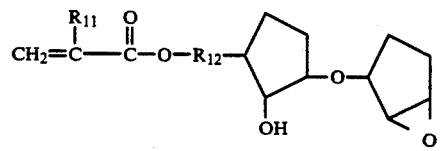 ⑤

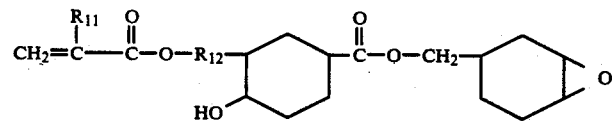 ⑥

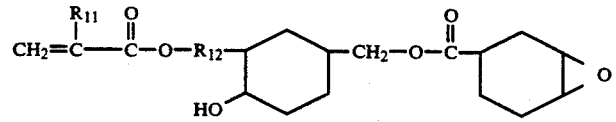 ⑦

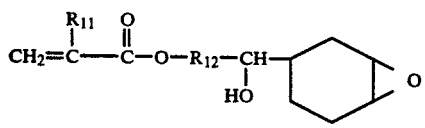 (8)

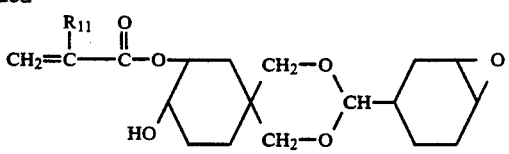 (9)

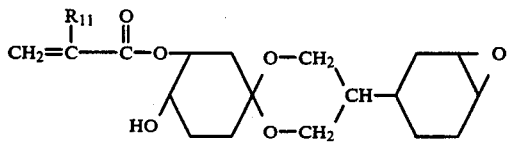 (10)

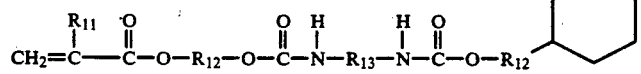 (11)

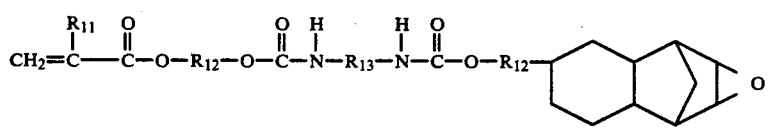 (12)

In said general formulae $R_{11}$ represents a hydrogen atom or a methyl group, $R_{12}$ represents a divalent aliphatic saturated hydrocarbon group having 1 to 6 carbon atoms, and $R_{13}$ represents a divalent hydrocarbon group having 1 to 10 carbon atoms.

In the aforesaid copolymerizable epoxy monomers, as a divalent aliphatic saturated hydrocarbon group having 1 to 6 carbon atoms represented b $R_{12}$, there may be cited a straight chain linear or branched chain alkylene group such as, for example, methylene, ethylene, propylene, tetramethylene, ethylethylene, pentamethylene and hexamethylene. As a divalent hydrocarbon group having 1 to 10 carbon atoms represented by $R_{13}$, there may be cited, for example, methylene, ethylene, propylene, tetramethylene, ethylethylene, pentamethylene, hexamethylene, polymethylene, phenylene,

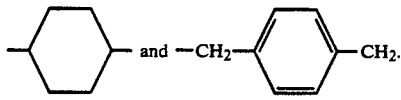

Specific examples of the polymerizable epoxy monomers represented by the aforesaid general formulae (1) to (12) include 3,4-epoxycyclohexylmethyl acrylate and 3,4-epoxycyclohexylmethyl methacrylate. They are commercially available, for example, under trade names of "METHB" and "AETHB", both products of Daicel Chemical Industries, Ltd. They have the epoxy functional group represented by said formula (I) or (II). Further, 4-vinylcyclohexene oxide may also be used as a polymerizable epoxy monomer.

The epoxy resin (B) may be produced by polymerizing one kind or at least two kinds of monomers selected from these polymerizable epoxy monomers, and at this time, it is also possible to copolymerize the other polymerizable unsaturated monomer.

As said the other polymerizable unsaturated monomer, it may be selected from a broad range according to the properties desired of the resulting (co)polymer. Typical examples of such other polymerizable unsaturated monomer include the following compounds.

(a) Acrylic acid or methacrylic acid esters: for example, alkyl esters having 1 to 18 carbon atoms of acrylic acid or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; alkoxyalkyl esters having 2 to 18 carbon atoms of acrylic acid or methacrylic acid such as methoxybutyl acrylate, methoxybutyl methacrylate, methoxyethyl acrylate, methoxyethyl methacrylate, ethoxybutyl acrylate and ethoxybutyl methacrylate; alkenyl esters having 2 to 8 carbon atoms of acrylic acid or methacrylic acid such as allyl acrylate and allyl methacrylate; hydroxyalkyl esters having 2 to 8 carbon atoms of acrylic acid or methacrylic acid such as 2-hydroxyethyl acrylate, 2-hydroxyethyl methacrylate, hydroxypropyl acrylate and hydroxypropyl methacrylate; and alkenyloxyalkyl esters having 3 to 18 carbon atoms of acrylic acid or methacrylic acid such as allyloxyethyl acrylate and allyloxyethyl methacrylate.

(b) Vinyl aromatic compounds: for example, styrene, alpha-methyl styrene, vinyl toluene and p-chlorostyrene.

(c) Polyolefin type compounds, for example, butadiene, isoprene and chloroprene.

(d) Others: acrylonitrile, methacrylonitrile, methylisopropenyl ketone, vinyl acetate VEOBA monomer (a product of Shell Chemicals), vinyl propionate, vinyl pivalate and a compound having a polycaprolactam chain (for example, FM-3X monomer, a trade name of a product of Daicel Chemical Industries, Ltd.)

The ratio of the polymerizable epoxy monomer to the other polymerizable unsaturated monomer may be optionally selected according to the object, within such a range as to enable the epoxy resin (B) obtained by these copolymerization reactions to contain at least 2, preferably at least 3, more preferably at least 4, epoxy functional groups on average in one molecule. But in order to invest the resulting polymer with sufficient curability, it is especially preferable to make the content of the polymerizable epoxy monomer in the solids content of said epoxy resin (B) within the range of 5 to 100% by more preferably 20 to 100% by weight.

Said third process for the production of the epoxy resin (B) may be carried out in the same manner as the polymerization reaction of ordinary acryl or vinyl resin monomers. As one of such polymerization reactions, a process which comprises dissolving or dispersing the respective monomer components in an organic solvent, and heating the resulting solution or dispersion at a temperature of about 60° to 180° C. with stirring in the presence of a radical polymerization initiator, may be shown. The reaction time may be normally about 1 to 10 hours. As the organic solvent, alcohol solvents, ether solvents, ester solvents and hydrocarbon solvents may be used. When the hydrocarbon solvent is used, it is preferable to use another cosolvent together with it from the standpoint of the solubility. Further, all of usually used radical polymerization initiators may be used. As the specific examples of such radical initiator, there may be exemplified peroxides such as benzoyl peroxide and t-butyl peroxy-2-ethyl hexanoate; and azo compounds such as azobisisobutyronitrile and azobis-dimethylvaleronitrile.

It is preferable that the epoxy resin (B) obtained by said third process for the production has a number average molecular weight within the range of generally about 3,000 to about 100,000, especially 4,000 to 10,000.

Of the aforesaid curing resins (B), the epoxy resin is most suitable having at least 3 epoxy functional groups, more preferably at least 4 such groups, most preferably at least 5 such groups, on average per molecule, having an epoxy equivalent within the range of preferably 100 to 2,000, more preferably 150 to 500, especially preferably 150 to 250, and a number average molecular weight within the range of preferably 400 to 100,000, more preferably 700 to 50,000, especially preferably 750 to 30,000.

The amount to use the curing resin (B) is properly changeable according to the kind of the base resin (A) used and within the range from the minimum amount enough to cure the resulting paint film thermally to the maximum amount not hurt the bath stability, but generally it is desirably within such a range that the weight ratio of the solids content of the curing resin (B) to the base resin (A) becomes 0.2 to 1.0, especially 0.25 to 0.85, more desirably 0.25 to 0.65.

The resin composition of the present invention may contain the curing resin (B) together with the base resin (A) in advance.

Thus, the composition comprising the base resin (A) and the curing resin (B) may be used as a resin for a cathodically electrodepositable paint.

For preparing the resin composition for a cathodically electrodepositable paint of the present invention, for example, the base resin (A) and the curing resin (B) are mixed, then the resulting mixture is stably dispersed in water. Then, as required, the resulting aqueous dispersion is added with a color pigment such as carbon black, titanium white, white lead, lead oxide and red iron oxide; an extender pigment such as clay and talc; an anticorrosive pigment such as strontium chromate, lead chromate, basic lead chromate, red lead, lead silicate, basic lead silicate, lead phosphate, basic lead phosphate, lead tripolyphosphate, lead silicochromate, chrome yellow, lead cyanamide, calcium plumbate, lead suboxide, lead sulfate and basic lead sulfate; or further with other additives. As the other additives that can be added, for example, a small amount of a dispersant or a nonionic surface active agent as a cissing preventing agent of the coated surface; and curing promotor may be cited.

Especially for making an electrodeposited paint on sufficiently curable at a low temperature of not more than 160° C., it is effective to add one kind or at least two kinds of metal compound selected from among a lead compound, a zirconium compound, a cobalt compound, an aluminum compound, a manganese compound, a copper compound, a zinc compound, an iron compound, a chromium compound and a nickel compound as a catalyst.

Specific examples of these metal compounds include chelated compounds such as zirconium acetyl acetonate, cobalt acetyl acetonate, aluminum acetyl acetonate and manganese acetyl acetonate; a chelation reaction product of compounds having beta-hydroxyamino structures with lead oxide (II); and carboxylates such as lead 2-ethyl hexanoate, lead oenanthate, lead naphthenate, lead octanoate, lead benzoate, lead acetate, lead lactate, lead formate, lead glycoate and zirconium octanoate.

Said metal compounds may be used in an amount calculated as a metal content based on the weight of the total solids content of the base resin (A) and the curing resin (B) of generally not more than 10% by weight, preferably not more than 5% by weight.

The thickness of a paint film obtained by electrodepositing the so prepared resin composition for a cathodically electrodepositable paint on a proper substrate is not strictly restricted, however, generally, the thickness within the range of 3 to 300 microns based on the cured paint film is suitable, and the paint film can be cured with heating at a temperature of, for example, 70° to 250° C., preferably 120° to 160° C.

A method of forming an electrodeposited paint film on the substrate using the resin composition for a cathodically electrodepositable paint of the present invention is not particularly restricted, but ordinary conditions for cathodically electrodepositing may be used. For example, the base resin (A) and the epoxy curing resin (B) according to this invention are, as mentioned above, dispersed in water, the resulting aqueous dispersion is blended with, as required, pigments, a curing catalyst and other additives, further, the mixture is diluted to the concentration of the solids content of the bath within the range of 5 to 40% by weight, preferably 10 to 25% by weight, and the bath pH is adjusted within the range of 5 to 8, preferably 5.5 to 7. Next, using this electrodeposition bath, electrodeposition is carried out under the following conditions with, for example, a carbon plate (5 cm×15·cm×1 cm) being used as an anode and for example, a zinc phosphated steel (5 cm×15 cm×0.7 mm) being used as a cathode.

Bath temperature: 20° to 35° C., preferably 25° 30° C.
Direct current
Current density: 0.005 to 2 A/cm$^2$, preferably 0.01 to 1 A/cm$^2$
Voltage: 10 to 500V, preferably 100 to 300V
Power feeding time: 0.5 to 5 min., preferably 2 to 3 min.

After the electrodeposition coating, the coated object is drawn up from the electrodeposition bath, rinsed with water, and then cured thermally by heating as mentioned above.

Hereinbelow, the present invention will be explained more specifically by examples. All parts and percentages in the following examples are by weight.

I. PRODUCTION EXAMPLES

(1) Base Resin (A-1)

Bisphenol A type epoxy resin having an epoxy equivalent of 950 (trade name "Epicoat 1004", a product of Shell Chemicals Co., Ltd.) (1900 parts) was disslved in 993 parts of butyl cellosolve, to the resulting solution, 210 parts of diethanol amine was added dropwise at a temperature of 80° to 100° C., then the resultant mixture was maintained at 100° C. for 2 hours to obtain a base resin (A-1) having a primary hydroxyl equivalent of 528 and an amine value of 53.

(2) Base Resin (A-2)

To 39 parts of monoethanol amine maintained at 60° C. in a reactor, 100 parts of N,N-dimethylaminopropylacrylamide was added dropwise, the mixture was reacted at 60° C. for 5 hours to obtain a monoethanolamine adduct of N,N-dimethylaminopropylacrylamide.

Separately, a reactor was charged with 950 parts of bisphenol A diglycidylether having an epoxy equivalent of 190, 340 parts of propylene glycol diglycidylether having an epoxy equivalent of 340, 456 parts of bisphenol A and 21 parts of diethanolamine, the content was heated to 120° C. and reacted until the epoxy balue became 1.02 mmole/g, then the reaction product was diluted with 479 parts of ethylene glycol monobutyl ether, cooled, and while the reaction system was maintained at 100° C., 158 parts of diethanol amine and 43 parts of a monoethanol amine adduct of said N,N-dimethylaminopropylacryl amide were added thereto, and the resulting mixture was reacted until the viscosity ceased to raise to obtain a base resin (A-2) having a resin solids content of 80%, a primary hydroxyl group equivalent of 518 and an amine value of 54.

Base Resin (A-3)

A reactor was charged with 950 parts of bisphenol A diglycidyl ether having an epoxy equivalent of 190, 330 parts of an epoxy resin XB-4122 (a trade name of a product of Ciba Geigy Ltd.) having an epoxy equivalent of 330, 456 parts of bisphenol A and 21 parts of diethanol amine, the content was heated to 120° C. and reacted until the epoxy value became 1.02 mmole/g, then the reaction product was diluted with 489 parts of ethylene glycol monobutyl ether, cooled, thereafter while the reaction system was maintained at 90° C., 126 parts of diethanol amine, 53.5 parts of monoethanol amine adduct of said N,N-dimethylaminopropylacryl amide and 18.5 parts of N-methylaminoethanol were added thereto, and the resulting mixture was reacted until the viscosity ceased to rise to obtain a base resin (A-3) having a resin solids content of 80%, a primary hydroxyl group equivalent of 592 and an amine value of 55.

(4) Base Resin (A-4)

Diethylene triamine (103 parts) was mixed with 200 parts of methylisobutyl ketone the mixture was heated to a temperature from 100° C. to 160° C. to distill off 36 parts of condensed water to thereby obtain ketiminated diethylene triamine.

Separately, 1,900 parts of a bisphenol A type epoxy resin having an epoxy equivalent of 950 (trade name "Epicoat 1004", a product of Shell Chemical Co, Ltd.) was dissolved in 993 parts of butyl cellosolve. To the resulting solution, 109.5 parts of diethyl amine and 133.5 parts of said ketiminated diethylene triamine were added dropwise at a temperature from 70 to 100° C., then the system was maintained at 100° C. for 2 hours to obtain a base resin (A-4) having a solids content of 68% and an amine value of 65.

(5) Base Resin (A-5)

A bisphenol A type epoxy resin having an epoxy equivalent of 950 (trade name "Epicoat 1004", a product of Shell Chemical Ltd.) (1900 parts) was dissolved in 993 parts of butyl cellosolve, to the resulting solution, 146 parts of diethyl amine was added dropwise at a temperature from 70° to 100° C., then the system was maintained at 100° C. for 2 hours to obtain a base resin (A-5) having a solids content of 67% and an amine value of 55.

(6) Curing Resin (B-1)

"EHPE.3150" trade name of the epoxy resin having an epoxy equivalent of 175 to 195, a product of Daicel Chemical Industries, Ltd.] (32.6 parts) and 8.2 parts of propylene glycol monomethyl ether were dissolved under heating at 100° C. to obtain 40.8 parts of a curing resin (B-1) having a solids content of 80% and an epoxy equivalent of 190. Said curing resin had a number average molecular weight of about 1,500.

(7) Curing Resin (B-2)

To a mixture of 136 parts of vinyl norbornene oxide, 124 parts of 4-vinylcyclohexene-1-oxide and 18 parts of trimethylol propane, 200 parts of a 10% ethyl acetate solution of $BF_3$-etherate was added dropwise at 50° C. over 4 hours to carry out a ring-opening polymerization. The resultant ring-opened polymer was added with ethyl acetate, washed with water, the ethyl acetate layer was concentrated, then 130 parts of ethyl acetate was added anew and dissolved, 160 parts of peracetic acid was made into an ethyl acetate solution and added dropwise at 50° C. over 5 hours, and the resultant mixture was matured for 2 hours to carry out an epoxidation reaction. After removing acetic acid, ethyl acetate and peracetic acid, the remaining epoxidation product was dissolved in 500 parts of ethyl acetate at 40° C., followed by washing with 250 parts of distilled water 4 times, then ethyl acetate was removed, then the matured product was dissolved in 78 parts of propylene glycol monoethyl ether at 80° C. to obtain a curing resin (B-2) having a solids content of 80% and an epoxy equivalent of 202. Said curing resin had a number average molecular weight of about 1,300.

(8) Curing Resin (B-3)

To a mixture of 304 parts of partially epoxidated lemonene (2-methyl-4-isopropenyl-1-cyclohexene oxide) and 18 parts of trimethylol propane, 200 parts of a 10% ethyl acetate solution of $BF_3$-etherate was added dropwise at 50° C. over 4 hours. The treatment thereafter was carried out as in the curing resin (B-2), and the matured product was dissolved in 80 parts of ethylene glycol monobutyl ether at 80° C. to obtain a curing resin (B-3) having a solids content of 80% and an epoxy equivalent of 205. Said curing resin had a number average molecular weight of about 1,000.

(9) Curing Resin (B-4)

The process (7) for producing a curing resin (B-2) was repeated except that 304 parts of 2,4 (or) 1,4-dimethyl-4-ethenyl-1-cyclohexane oxide was used to obtain a curing resin (B-4) having a solids content of 80% and an epoxy equivalent of 199. Said curing resin had a number average molecular weight of about 950.

(10) Curing Resin (B-5)

To a mixture of 460 parts of "Celoxide 3000"

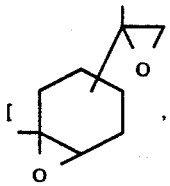

a trade name of a product of Daicel Chemical Industries, Ltd.], 0.3 part of aluminum acetyl acetonate and 5 parts of tetraethoxy silane, 0.1 part of distilled water was added, the mixture was maintained at 80° C. for 1 hour, then reacted at 120° C. for 3 hours, then to the reaction product was added 116 parts of ethylene glycol monobutyl ether to obtain a curing resin (B-5) having a solids content of 80% and an epoxy equivalent of 280. Said curing resin has a number average molecular weight of about 1,700.

(11) Curing Resin (B-6)

A cyclopentadiene dimer (132 parts) was dissolved in 70 parts of ethyl acetate, to the resulting solution, 160 parts of peracetic acid as an ethyl acetate solution was added dropwise at 35° C. over 7 hours, and the mixture was further matured at 40° C. for 6 hours. After removal of acetic acid, ethyl acetate and peracetic acid, the matured product was dissolved at 40° C. in 500 parts of ethyl acetate, followed by washing with 250 parts of distilled water 5 times, then ethyl acetate was removed and the matured product was dissolved at 80° C. in 43 parts of methylisobutyl ketone to obtain a compound (D) having a solids content of 80% and an epoxy equivalent of 90. 4-Vinylcyclohexene (94 parts) was dissolved in 75 parts of ethyl acetate, to the resulting solution, 160 parts of peracetic acid made into an ethyl acetate solution was added dropwise at 50° C. over 4 hours, and further matured at 50° C. for 2 hours. After removal of acetic acid, ethyl acetate and peracetic acid, the matured product was dissolved in 500 parts of ethyl acetate at 40° C., followed by washing with 250 parts of distilled water 5 times, then ethyl acetate was removed, and the matured product was dissolved at 80° C. in 32 parts of methylisobutyl ketone to obtain a compound (E) having a solids content of 80% and an epoxy equivalent of 65. To a mixture of 225 parts of the compound (D) and 163 parts of the compound (E), 0.2 part of aluminum acetyl acetonate and 10 parts of trimethylol propane were added, the resulting mixture was maintained at 100° C. for 1 hour, then reacted at 150° C. for 3 hours, then 60 parts of ethylene glycol monobutyl ether was added to cool the system to thereby obtain a curing resin (B-6) having a solids content of 70% and an epoxy equivalent of 210. Said curing resin had a number average molecular weight of about 1,100.

(12) Curing Resin (B-7)

Azobisdimethylvaleronitrile (2 parts) dissolved in 33.4 parts of METHB monomer (3,4-epoxycyclohexyl-methyl methacrylate) was added dropwise to a mixed solvent of 10 parts of methylisobutyl ketone and 10 parts of butyl cellosolve heated at 100° C. over 2 hours, the resulting mixture was matured for 1 hour, then heated to 125° C., at which temperature the matured mixture was further matured for 1 hour to obtian a curing resin (B-7) having a solids content of 60% and an epoxy equivalent of 196. Said curing resin had a number average molecular weight of about 10,000.

(13) Curing Resin (B-8)

Azobisdimethylvaleronitrile (2.4 parts) dissolved in a mixture of 32.0 parts of an METHB monomer and 8.0 parts of hydroxyethyl acrylate was added dropwise to 24 parts of butyl cellosolve heated at 100° C. over 2 hours, and matured for 1 hour, then the system was heated at 125° C., and again matured for 1 more hour to obtain a curing resin (B-8) having a solids content of 60% and an epoxy equivalent of 245. Said curing resin had a number average molecular weight of about 12,000.

(14) Curing Resin (B-9)

Azobisdimethylvaleronitrile (2.4 parts) dissolved in a mixture of 37 parts of 3,4-epoxycyclohexylmethyl acrylate and 3 parts of hydroxyethyl acrylate was treated in the same way as in the preceding process for the production of a curing resin (B-8) to obtain a curing resin (B-9) having a solids content of 60% and an epoxy equivalent of 200. Said curing resin had a number average molecular weight of about 15,000.

(15) Pigment Paste (P-1)

A base resin (A-2) (12.5 parts) was added with 4.4 parts of 10% formic acid, to which 15 parts of deionized water was added with stirring, the resulting mixture was further added with 10 parts of titanium white, 10 parts of clay, 1 part of carbon and 2 parts of basic lead silicate. The resulting mixture was dispersed in a ball mill for 24 hours, then added with 11 parts of deionized water to obtain a paste (P-1) having a solids content of 50%.

(16) Pigment Paste (P-2)

The preceding procedure for producing a pigment paste (P-1) was repeated except that 3 parts of basic lead sulfate was added to 2 parts of basic lead silicate to obtain a pigment paste (P-2).

(17) Pigment Paste (P-3)

In the same way as a procedure to obtain a pigment paste (P-1) except that 12.5 parts of a base resin (A-2) was replaced by 14.7 parts of a base resin (A-4), a pigment paste (P-3) was obtained.

*1) Comparative Example

A reactor was charged with 700 parts of an epoxy resin (Epon 836) having an epoxy equivalent of 290 to 335 and a molecular weight of 580 to 680 and produced by reaction of bisphenol A with epichlorohydrin, to which 78 parts of monoalcohol A and 13 parts of a 90% aqueous solution of formic acid were added. The resuting mixture was heated at a temperature of 140 to 150° C. for 5 hours, then volatile substances were removed under reduced pressure. The resulting epoxy compound had an epoxy value of about 520. A mixture of 734 parts of the so obtained epoxy compound and 1 part of ethylene glycol dimethyl ether was heated to 60° C., to which 25.4 parts of dimethylethanol amine was added over more than 20 minutes, followed by addition of 74 parts of deionized water. The resulting mixture was cooled, to which aqueous acetic acid was added to maintain the pH of the solution at 6.6 and the solids content at 90%. The solids content of the resulting transparent solution was further reduced to 10% with deionized water. The "monoalcohol A" used above is a reaction product of a reaction in which 5 moles of ethylene oxide is used per mole of ethanol.

II. EXAMPLES

Using the base resins and the curing resins obtained in the aforesaid Production Examples, aqueous emulsions were prepared to obtain the resin compositions for a cationically electrodepositable paint, the objects of the present invention. The compositions and the blending amounts of the respective ingredients of these resin compositions are shown in the following Table 1.

TABLE 1

| Example | Base resin | Curing resin | 10% aqueous solution of formic acid | Lead octanoate | Deionized water | pH |
|---|---|---|---|---|---|---|
| 1 | (A-1) 88 | (B-1) 37.5 | 29 | 2.6 | 293 | 5.6 |
| 2 | (A-2) 88 | (B-1) 37.5 | 15 | 2.6 | 307 | 6.4 |
| 3 | (A-3) 88 | (B-1) 37.5 | 15 | 2.6 | 307 | 6.4 |
| 4 | (A-2) 88 | (B-2) 37.5 | 15 | 2.6 | 307 | 6.4 |
| 5 | (A-2) 88 | (B-3) 37.5 | 15 | 2.6 | 307 | 6.4 |
| 6 | (A-2) 88 | (B-4) 37.5 | 15 | 2.6 | 307 | 6.4 |
| 7 | (A-1) 88 | (B-5) 37.5 | 15 | 2.6 | 293 | 5.6 |
| 8 | (A-1) 88 | (B-6) 37.5 | 15 | 2.6 | 293 | 5.6 |
| 9 | (A-1) 88 | (B-7) 37.5 | 15 | 2.6 | 293 | 5.6 |
| 10 | (A-3) 88 | (B-8) 37.5 | 15 | 2.6 | 307 | 6.4 |
| 11 | (A-3) 88 | (B-9) 37.5 | 15 | 2.6 | 307 | 6.4 |
| 12** 12-1 | (A-5) 60 | (B-7) 37.5 | 25 | 0 | 200 | 5.8 |
| 12-2 | (A-4) 28 | 0 | 4 | 2.6 | 93 | |
| 13** 13-1 | (A-2) 51 | (B-1) 37.5 | 11 | 0 | 200 | 6.5 |
| 13-2 | (A-4) 28 | 0 | 4 | 2.6 | 102 | |
| Comparative Example 1 | (*1) | — | — | — | — | 6.6 |

Examples 12 and 13 use 12-1/12-2 and 13-1/13-2 in admixture, respectively.

III. RESULTS OF PERFORMANCE TESTS

By mixing 450 parts of the compositions (aqueous dispersions each having a solids content of 20%) with 66 parts of said pigment pastes and 99 parts of deionized water, 20% electrodeposition baths were prepared. At the bath temperature of 30° C., the compositions were electrodeposited on a plate treated with lead phosphate at a voltage of 200 to 300V for 3 minutes, and the compositions were baked at 160° C. for 30 seconds to obtain cured coatings of paint films of a thickness of 15 to 23 microns. The results of their performances tested are shown in the following Table 2.

TABLE 2

| | Composition | | Test results | | | |
|---|---|---|---|---|---|---|
| Sample | Example | Pigment paste | Impact resistance | Salt spray resistance 1,000 | 2,000 | Weight loss on heating |
| 1 | 1 | P-2 | yes | yes | yes | 3.6 |
| 2 | 2 | P-1 | " | " | " | 3.8 |
| 3 | 3 | P-2 | " | " | " | 3.8 |
| 4 | 4 | P-1 | " | " | " | 3.7 |
| 5 | 5 | P-1 | " | " | " | 3.8 |
| 6 | 6 | P-1 | " | " | " | 4.0 |
| 7 | 7 | P-1 | " | " | " | 3.9 |
| 8 | 8 | P-1 | " | " | " | 3.6 |
| 9 | 9 | P-1 | " | " | " | 3.9 |
| 10 | 10 | P-1 | " | " | " | 4.1 |
| 11 | 11 | P-1 | " | " | " | 3.9 |
| 12 | 12 | P-3 | " | " | " | 3.7 |
| 13 | 13 | P-1 | " | " | " | 3.9 |
| 14 | Comparative Example 1 | — | no | no | no | — |

After the aforesaid electrodeposition baths were stored at 30° C. for 30 days, the samples prepared in the stored baths were subjected to the same impact resistance tests and salt spray tests as mentioned above. As a result, the deterioration was not recognized in Samples Nos. 1 to 13, however, in the case of Sample No. 14, the results were worse than the results of the initial tests.

Methods of testing the performances, the results of which are shown in Table 2, above are as follows.

(1) Impact Resistance (of the Du Pont System)

The coated test plate is stored in an air-conditioned room in which the temperature is adjusted to 20±1° C. and the humidity is adjusted to 75+2% for 24 hours, then on a du Pont impact tester, a cradle and an impact center of the prescribed sizes are mounted, the sample is inserted between them with the coated surface facing upward, next a regular weight is caused to fall on the imapct center from the prescribed height, and when the coated paint film is free from breakage and exfoliation due to the impact, the sample is defined as standing the test.

(2) Salt Spray Resistance

A test is carried out according to JIS Z2371, and when the swell of the coated paint film within 2.0 mm on one side of the width of the creek from the cut (linear incisure) portion of the coated paint film or of the portion other than the cut portion is less than 8F (ASTM), the sample is defined as standing the test. The testing time was 1,000 hours and 2,000 hours.

(3) Weight Loss on Heating

The weight of the treated plate weights $W_O$, on said plate the sample is electrodeposited at 30° C. for 3 minutes, then the plate is dried under reduced pressure inside a vacuum dryer, after the electrodeposition, at 80° C. for 1 hour, the weight of the dried plate is measured as $W_1$, and the weight after the resin composition is baked at 180° C. for 30 minutes in the dryer is measured as $W_2$. The weight loss on heating $\Delta W$ is calculated from the following equation.

$$\Delta W = \frac{W_2 - W_0}{W_1 - W_0} \times 100\ (\%)$$

What is claimed is:

1. A cationic electrodeposition paint comprising:
 (A) a resin having primary hydroxyl groups and cationic groups consisting of tertiary amino groups, said resin being a reaction product of a polyepoxide compound and a secondary amine having hydroxyl group(s); and
 (B) an epoxy resin having at least 3 epoxy functional groups selected from the group consisting of the following formulae (I) and (II):

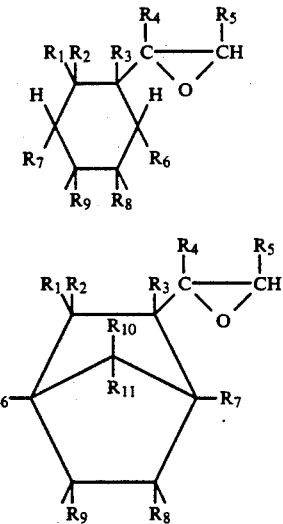

wherein
R$_1$, R$_2$, R$_3$, R$_5$, R$_6$, R$_7$, R$_{10}$ and R$_{11}$, represent H, CH$_3$ or C$_2$H$_5$, respectively, and R$_4$, R$_8$ and R$_9$ represent H or CH$_3$, respectively.

2. A cationic electrodeposition paint of claim 1, wherein said polyepoxide compound is obtained from a polyphenol compound and epichlorohydrin.

3. A cationic electrodeposition paint of claim 1, wherein said epoxy functional group is represented by the formula (V)

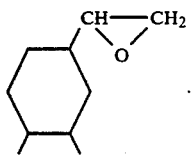

4. A cationic electrodepositing paint of claim 2, wherein said polyepoxide compound is polyglycidyl ether of a the polyphenol compound having a number average molecular weight of about 800 to about 2,000 and an epoxy equivalent of 190 to 2,000.

5. A cationic electrodeposition paint of claim 1, said resin (A) having a hydroxyl equivalent within the range of 20 to 5,000.

6. A cationic electrodeposition paint of claim 1, said resin (A) having a primary hydroxyl equivalent within the range of 200 to 1,000.

7. A cationic electrodeposition paint of claim 1, wherein said resin (A) has an amine value within the range of 3 to 200 calculated as KOH (mg/g solids).

8. A cationic electrodeposition paint of claim 1, wherein said epoxy resin (B) has an epoxy equivalent within the range of 100 to 2,000.

9. The resin composition of claim 8, wherein said epoxy resin (B) has an epoxy equivalent within the range of 150 to 500.

10. A cationic electrodeposition paint of claim 1, wherein said epoxy resin (B) has a number average molecular weight within the range of 400 to 100,000.

11. A cationic electrodeposition paint of claim 1, wherein said epoxy resin (B) has a number average molecular weight within the range of 700 to 50,000.

12. A cationic electrodeposition paint of claim 1, wherein the weight ratio of the solids content of said epoxy resin (B) to said resin (A) is within the range of from 0.2:1 to 1.0:1.

13. A cationic electrodeposition paint of claim 1, containing at least one metal compound selected from the group consisting of a lead compound, a zirconium compound, a cobalt compound, an aluminum compound, a manganese compound, a copper compound, a zinc compound, an iron compound, a chromium compound and a nickel compound is contained in such an amount that the metal content based on the total weight of the resin (A) and the epoxy resin (B) is not more than 10% by weight.

14. A product coated with a cationic electrodeposition paint of claim 1.

* * * * *